(12) United States Patent
Lim et al.

(10) Patent No.: US 10,475,174 B2
(45) Date of Patent: Nov. 12, 2019

(54) VISUAL ANOMALY DETECTION SYSTEM

(71) Applicant: General Electric Company, Schenectady, NY (US)

(72) Inventors: Ser Nam Lim, Schenectady, NY (US); David Diwinsky, West Chester, OH (US); Yen-Liang Lin, Niskayuna, NY (US); Xiao Bian, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 252 days.

(21) Appl. No.: 15/480,670

(22) Filed: Apr. 6, 2017

(65) Prior Publication Data

US 2018/0293734 A1 Oct. 11, 2018

(51) Int. Cl.
*G06T 7/194* (2017.01)
*G06T 7/00* (2017.01)
*G06N 3/08* (2006.01)
*G06K 9/00* (2006.01)
(Continued)

(52) U.S. Cl.
CPC .............. *G06T 7/0004* (2013.01); *G06K 9/00* (2013.01); *G06K 9/627* (2013.01); *G06N 3/0454* (2013.01); *G06N 3/0472* (2013.01); *G06N 3/08* (2013.01); *G06K 2209/19* (2013.01);
(Continued)

(58) Field of Classification Search
CPC ........... G06T 7/194; G06T 2207/20081; G06T 2207/20084; G06T 7/0004; G06T 2207/30164; G06N 3/02; G06N 3/08; G06N 3/0454; G06N 3/0472; G06K 9/6267;
(Continued)

(56) References Cited

U.S. PATENT DOCUMENTS

| 5,331,550 A | 7/1994 | Stafford et al. |
| 6,622,135 B1 | 9/2003 | Imbert De Tremiolles et al. |
| 7,768,658 B2 | 8/2010 | Tsai et al. |

(Continued)

OTHER PUBLICATIONS

Goto et al. "Anomalous network communication detection system by visual pattern on a client computer" SAC '15 Proceedings of the 30th Annual ACM Symposium on Applied Computing, Apr. 13-17, 2015, pp. 1263-1269.
(Continued)

*Primary Examiner* — Yon J Couso
(74) *Attorney, Agent, or Firm* — Christopher R. Carroll; The Small Patent Law Group LLC

(57) ABSTRACT

A generative adversarial network (GAN) system includes a generator neural sub-network configured to receive one or more images depicting one or more objects. The generator neural sub-network also is configured to generate a foreground image and a background image based on the one or more images that are received, the generator neural sub-network configured to combine the foreground image with the background image to form a consolidated image. The GAN system also includes a discriminator neural sub-network configured to examine the consolidated image and determine whether the consolidated image depicts at least one of the objects. The generator neural sub-network is configured to one or more of provide the consolidated image or generate an additional image as a training image used to train another neural network to automatically identify the one or more objects in one or more other images.

13 Claims, 5 Drawing Sheets

(51) Int. Cl.
*G06K 9/62* (2006.01)
*G06N 3/04* (2006.01)

(52) U.S. Cl.
CPC ............... *G06T 2207/20081* (2013.01); *G06T 2207/20084* (2013.01); *G06T 2207/30164* (2013.01)

(58) Field of Classification Search
CPC ...... G06K 9/00456; G06K 9/00; G06K 9/627; G06K 2209/19
See application file for complete search history.

(56) References Cited

U.S. PATENT DOCUMENTS

| | | | |
|---|---|---|---|
| 8,131,107 B2 | 3/2012 | Sun et al. | |
| 8,402,540 B2 | 3/2013 | Kapoor | |
| 9,122,956 B1 | 9/2015 | Fink et al. | |
| 9,262,822 B2 | 2/2016 | Fukuyama et al. | |
| 10,049,308 B1* | 8/2018 | Dhua | G06K 9/4628 |
| 2016/0196643 A1* | 7/2016 | Bendall | G06T 7/50 382/108 |
| 2017/0244908 A1* | 8/2017 | Flack | G06K 9/00234 |
| 2018/0189642 A1* | 7/2018 | Boesch | G06F 17/505 |
| 2018/0260668 A1* | 9/2018 | Shen | G06K 9/6256 |

OTHER PUBLICATIONS

Zhu et al. "Generative Visual Manipulation on the Natural Image Manifold" Computer Vision—ECCV 2016 Sep. 16, 2016, vol. 9909 pp. 597-613.

Goodfellow; Pouget-Abadle; Mirza, Xu, Warde-Farley; Ozair; Courville; Benglo; "Generative Adversarial Nets", D'epartement d'informatique et de recherche op'erationnelle Universit'e de Montr'eal Montr'eal, QC H3C 3J7, Jun. 10, 2014, 9 pages.

Karpathy; "CS231n Convolutional Neural Networks for Visual Recognition, Convolutional Neural Networks (CNNs / ConvNets)" http://cs231n.github.io/convolutional-networks/, 26 pages.

Nielsen; "Using Neural Nets to Recognize Handwritten Digits" http://neuralnetworksanddeeplearning.com/chap1.html 2, Neural Networks and Deep Learning, Jan. 2017, 54 Pages.

Long; Shelhamer; Darrell; "Fully Convolutional Networks for Semantic Segmentation", UC Berkeley, The IEEE Conference on Computer Vision and Pattern Recognition (CVPR), 2015, 10 Pages.

Li; Karpathy; "CS231n Convolutional Neural Networks for Visual Recognition", http://cs231n.github.io/neural-networks-1/, 2015, 15 pages.

* cited by examiner

VISUAL ANOMALY DETECTION SYSTEM

FIELD

The subject matter described herein relates to image analysis systems that use one or more neural networks.

BACKGROUND

Equipment can become worn over time and, eventually, fail. For example, blades in turbines may develop spalls or cracks over time, which can lead to catastrophic failure of the turbines and/or significant downtime of the turbines if the damage is not discovered sufficiently early to avoid significant repair or replacement of parts in the turbines. Some known systems and methods can visually inspect the components of equipment in order to identify damage to the equipment.

But, these systems and methods have certain faults. As one example, the characterization of the damage appearing in images or video of the equipment can be highly subjective and prone to error. As another example, some of these systems and methods rely on image background subtraction approaches, which are susceptible to non-stationary background object movements and require precise alignment.

Some systems and methods use a trained neural network to identify damage to equipment in images, but these neural networks can require training to identify the damage. This training can require input of annotated or labeled images into the neural network. These images have pixels labeled with object classes represented by the different pixels. Different object classes are associated with different objects, such as cracks, coating spalling, etc. Creation of the annotated or labeled images can be a time-consuming and expensive process for training the neural networks.

BRIEF DESCRIPTION

In one embodiment, a generative adversarial network (GAN) system includes a generator neural sub-network configured to receive one or more images depicting one or more objects. The generator neural sub-network also is configured to generate a foreground image and a background image based on the one or more images that are received, the generator neural sub-network configured to combine the foreground image with the background image to form a consolidated image. The GAN system also includes a discriminator neural sub-network configured to examine the consolidated image and determine whether the consolidated image depicts at least one of the objects. The generator neural sub-network is configured to one or more of provide the consolidated image or generate an additional image as a training image used to train another neural network to automatically identify the one or more objects in one or more other images.

In one embodiment, a method includes receiving one or more images depicting one or more objects at a generator neural sub-network of a GAN system, generating a foreground image and a background image using the generator neural sub-network and based on the one or more images that are received, combining the foreground image with the background image to form a consolidated image using the generator neural sub-network, and examining the consolidated image and determine whether the consolidated image depicts at least one of the objects using a discriminator neural sub-network of the GAN system. One or more of the consolidated image or an additional generated image is configured to be provided to another artificial neural network as a training image for training the artificial neural network to automatically identify the one or more objects in one or more other images.

In one embodiment, a GAN system includes a generator neural sub-network configured to receive one or more images depicting one or more objects. The generator neural sub-network also is configured to generate a foreground image and a background image based on the one or more images that are received, the generator neural sub-network configured to combine the foreground image with the background image to form a consolidated image. The GAN system also includes a discriminator neural sub-network configured to examine the consolidated image and determine whether the consolidated image depicts at least one of the objects. The generator neural sub-network is configured to one or more of provide the consolidated image or generate an additional image as a training image used to train another neural network to automatically identify the one or more objects in one or more other images. The generator neural sub-network is configured to receive the one or more images without pixels of the one or more images that are received being labeled as depicting one or more object classes.

BRIEF DESCRIPTION OF THE DRAWINGS

The present inventive subject matter will be better understood from reading the following description of non-limiting embodiments, with reference to the attached drawings, wherein below.

DETAILED DESCRIPTION

Figure 1:
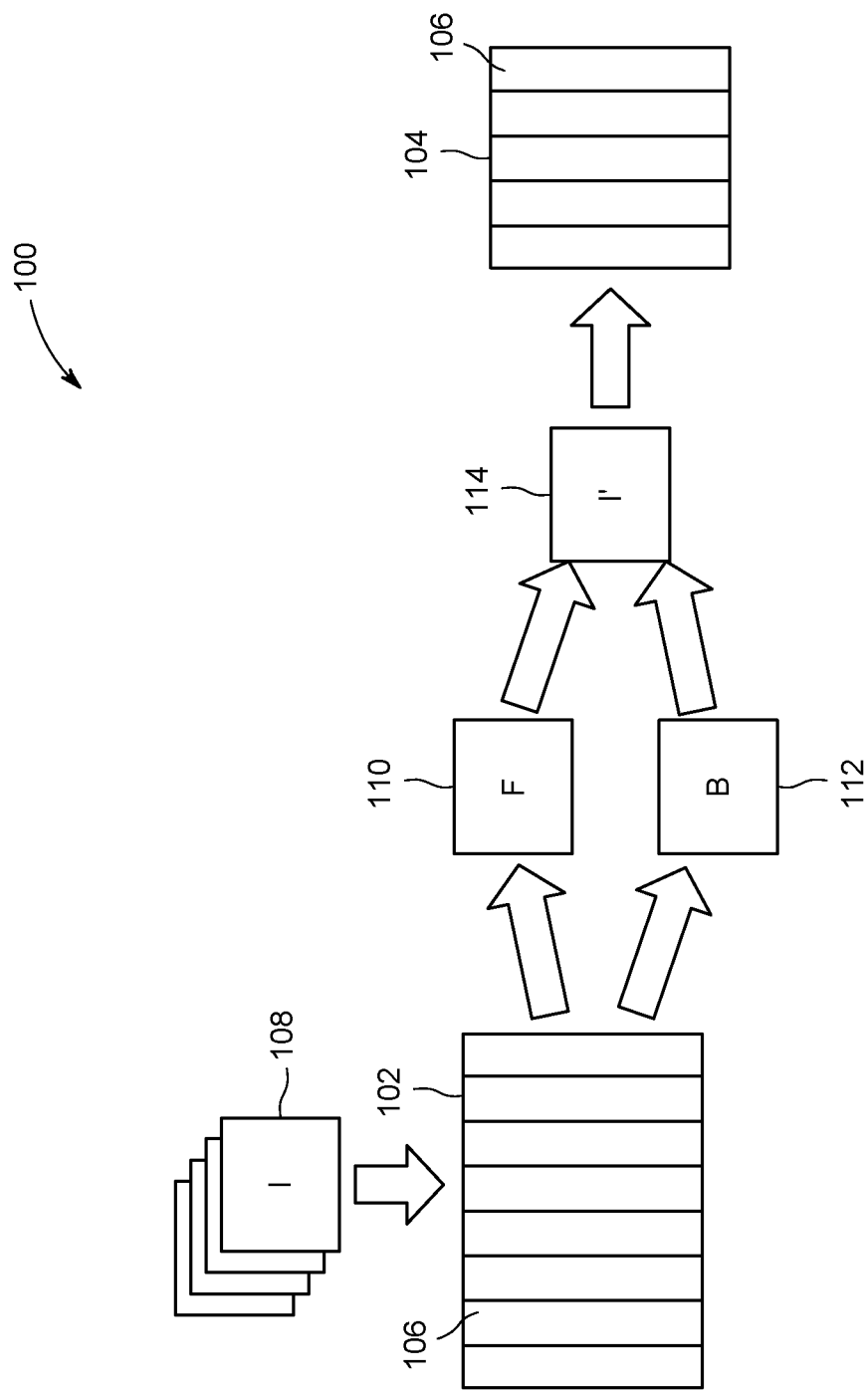
FIG. 1 illustrates one embodiment of a visual anomaly detection system.

One or more embodiments of the inventive subject matter described herein provide systems and methods that train neural networks to identify objects such as damage to equipment in images. The systems and methods include or use GAN systems to learn how to create realistic or accurate images (e.g., of damage to equipment), that are used to train other neural networks for identifying damage to equipment using other images. Different from the conventional background subtraction approaches (which are susceptible to non-stationary background object movements and require precise alignment), the systems and methods described herein can use GAN systems to better model the appearance of normal scenes (e.g., images that do not depict damage to equipment) and automatically detect anomalies (e.g., damage to equipment) by recovering the normal reconstruction (e.g., equipment without damage) from the abnormal images. Additionally, the GAN systems can be trained with only weak or no annotations to the images during training, which significantly reduces the manual annotation efforts compared to prior supervised segmentation approaches.

In one embodiment of the inventive subject matter described herein, a GAN-based system generates plausible images of normal scenes, and automatically produces normal reconstructions from the abnormal images. During training of the GAN-based system, the network system only takes normal or abnormal images (e.g., without requiring pixel-level annotations or pair-wise information about the images). The systems and methods both improve the image reconstruction and adversarial losses to ensure that the systems and methods generate plausible images for normal scenes that are aligned to the original images. Other systems and methods learn a background model for a fixed scene or image, and then detect anomalies by comparing pixel values in an image that includes the anomalies to the learned background model. These approaches, however, cannot handle large variations within the scenes and require precise alignment between the background model and the image. One or more embodiments of the inventive systems and methods described herein can handle large variations between images and/or do not require alignment between the background model and images.

A GAN system includes artificial neural networks, namely a generator neural sub-network and a discriminator neural sub-network. These sub-networks interact in a setting of a two-player minimax game. During training, the generator sub-network is provided with one or more images of anomalies. These images can be referred to as anomaly training images. The training images are not previously labeled or annotated in one embodiment. The generator sub-network determines distributions of pixel characteristics from the training images, and creates one or more images of anomalies (or foregrounds of the images, also referred to herein as created anomaly images or created foreground images) and one or more images of backgrounds (or images with the anomalies removed, also referred to as created background images). These foreground and background images are created by the generator sub-network based on the distributions of pixel characteristics in the training images.

The foreground and background images are combined by the generator sub-network into a consolidated image. The consolidated image is provided to the discriminator sub-network. The discriminator sub-network attempts to determine whether the consolidated image is a realistic image of an anomaly. For example, the discriminator sub-network can determine loss functions, errors, or confidence values indicative of how certain the discriminator sub-network is that the consolidated image is an image acquired by a camera of an actual anomaly (e.g., damage to a turbine blade). If the discriminator sub-network determines that the consolidated image is a realistic image of an anomaly, then the consolidated image can be provided to another neural network (e.g., another GAN system or another artificial neural network) to train the neural network to automatically identify anomalies in other images. At least one technical effect of the systems and methods described herein includes the generation of training images used to teach an artificial neural network to automatically identify damage to equipment for the repair of the equipment.

Figure 2:
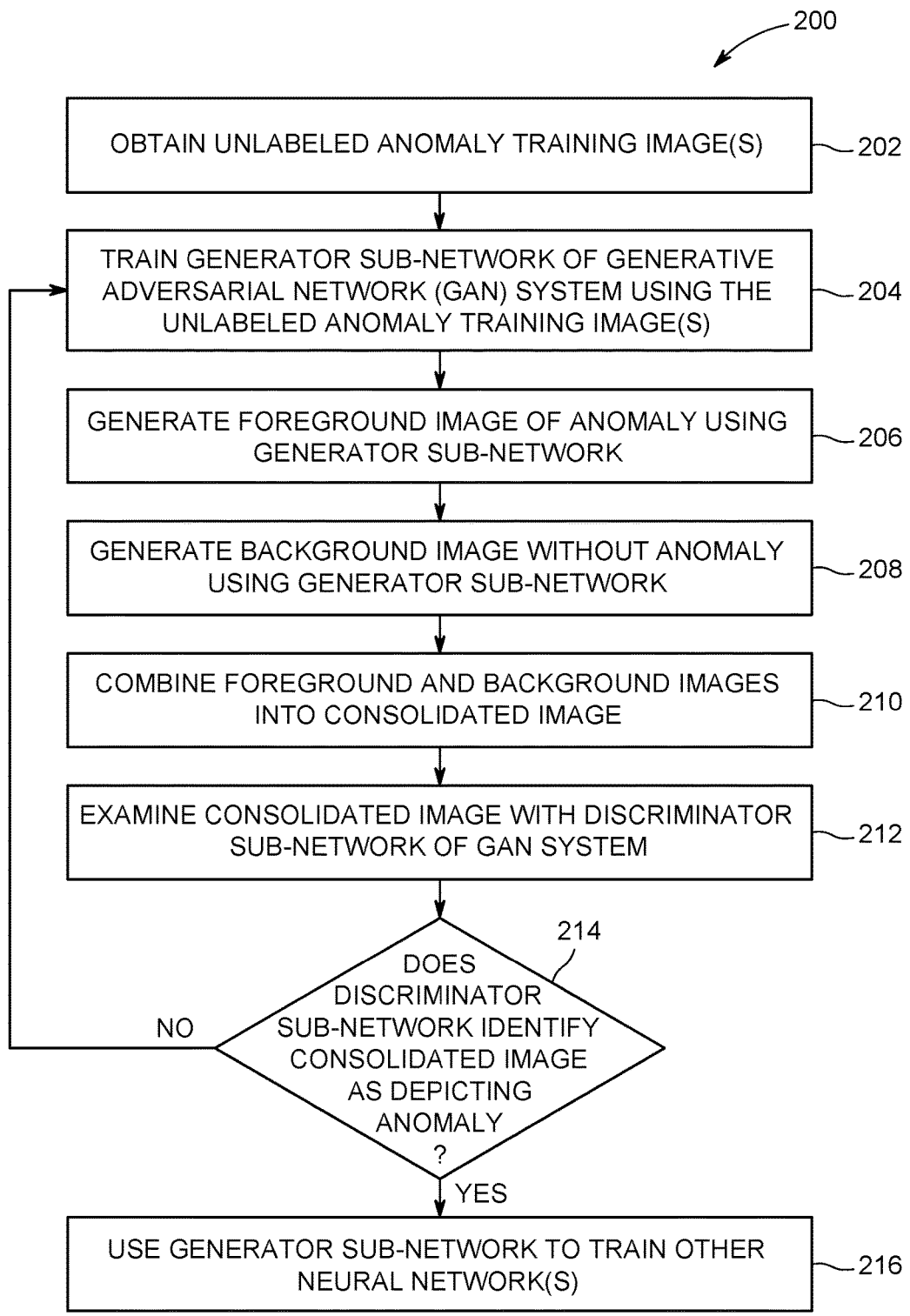
FIG. 2 illustrates a flowchart of one embodiment of a method for training a neural network to automatically detect anomalies in images.

FIG. 1 illustrates one embodiment of a visual anomaly detection system 100. FIG. 2 illustrates a flowchart of one embodiment of a method 200 for training a neural network to automatically detect anomalies in images. The flowchart of the method 200 can represent operations performed by the system 100 shown in FIG. 1, such as functions performed by one or more processors (e.g., one or more microprocessors, field programmable gate arrays, and/or integrated circuits) under the direction of software, to determine how to create images representative of anomalies that may appear in images. Optionally, the method 200 can represent an algorithm used to write such software. The created images can be provided to another artificial neural network to train the other neural network how to automatically identify anomalies in other images. While the description herein focuses on detection of damage to equipment as anomalies (e.g., spalling, cracks, etc., in thermal barrier coatings on turbine components), one or more embodiments can be used to detect other anomalies, such as the presence of persons or objects in the path of a moving vehicle, differences between faces for facial recognition, etc.

The system 100 includes neural networks 102, 104 and, in one embodiment, represents a GAN system. The neural networks 102, 104 are artificial neural networks formed from one or more processors (e.g., microprocessors, integrated circuits, field programmable gate arrays, or the like). The neural networks 102, 104 are divided into two or more layers 106, such as input layers that receive images, output layers that output an image or loss function (e.g., error, as described below), and one or more intermediate layers. The layers 106 of the neural networks 102, 104 represent different groups or sets of artificial neurons, which can represent different functions performed by the processors on the images to automatically identify objects in the images, such as anomalies (e.g., damage to coatings or equipment), persons, or other objects (e.g., other vehicles, trees, signs, etc.). The neural network 102 represents a generator sub-network of a GAN, and the neural network 104 represents a discriminator sub-network of the GAN in one embodiment.

In operation, at 202 in the flowchart of the method 200 shown in FIG. 2, the generator sub-network 102 receives one or more training images 108. The training images 108 can be unlabeled training images in that training images 108 depict anomalies, such as damage to a coating of a turbine blade, but none or relatively few (e.g., less than 50%, less than 40%, less than 10%, or the like) of pixels 110 in the training images 108 are labeled. Labeled pixels include pixels in an image that are associated with or identified as representing various object classes, such as types of objects shown in the image. For example, a labeled image may have some pixels identified as representing a crack in a turbine blade, other pixels identified as representing the turbine blade, and/or other pixels identified as representing other objects. Labeling of images can be a time-intensive and costly process. Instead of using such labeled images, the training images 108 provided to the generator sub-network 102 can be unlabeled or lightly labeled images, meaning that very few or no pixels 110 in the training images 108 are labeled with the object classes represented by the pixels 110.

The image(s) 108 can be obtained by the generator sub-network 102 by a camera communicating the image(s) 108 to the generator sub-network 102 via one or more wired and/or wireless connections. Optionally, the image(s) 108 can be stored in a tangible and non-transitory computer readable memory, such as a computer hard drive, optical disk, or the like, and be accessible by the generator sub-network 102 via one or more wired and/or wireless connections.

At 204 in the method 200, the generator sub-network 102 is trained using the unlabeled or lightly labeled image(s) 108 of one or more anomalies. The generator sub-network 102 can be trained by the processor(s) of the generator sub-network 102 can examine characteristics of pixels in the training image(s) 108 of anomalies. These characteristics can include locations of the pixels in the image(s) 108 (e.g., absolute and/or relative locations), intensities of the pixels, colors of the pixels, etc. The generator sub-network 102 can determine statistical distributions (e.g., Gaussian distributions) of the pixel characteristics. Different distributions can be determined for different pixels or locations (e.g., relative and/or absolute locations) in the image(s) 108. The generator sub-network 102 can examine the statistical distributions and determine probabilities of each pixel having various characteristics. For example, peaks in the distributions of pixel characteristics can indicate a greater probability or likelihood that the characteristic(s) associated with that peak are likely or more likely to appear in the corresponding pixel.

At 206, one or more foreground images 110 are generated by the generator sub-network 102. The generator sub-network 102 can generate the foreground image(s) 110 based on the distributions and probabilities of pixel characteristics that were determined at 204. For example, in the images 108 of one or more anomalies, certain neighboring pixels can have greater probabilities of similar appearances. These pixels can represent segments of anomalies due to the similar appearances of the pixels. For example, spalling of a thermal barrier coating on the turbine blade in the training images 108 can appear as a darker quasi-circular shape on a lighter background (e.g., the undamaged portion of the coating). The distributions of the characteristics of the pixels depicting the spalling can represent greater probabilities that these pixels are close to each other (e.g., within a designated distance, such as 100 pixels), that these pixels have intensities and/or colors within a designated threshold of each other (e.g., intensities and/or color wavelengths within 10%), and/or that these pixels have intensities and/or colors that are outside of the designated threshold of other pixels (e.g., those pixels representing undamaged portions of the coating).

The generator sub-network 102 can generate the foreground image(s) 110 in an attempt to create additional images of the anomalies shown in the training images 108 without making copies of the training images 108 or without merely subtracting out the backgrounds of the training images 108. In one embodiment, the foreground images 110 include or depict only those pixels representing the anomalies. That is, no part of the background equipment may be shown.

At 208, one or more background images 112 are generated by the generator sub-network 102. The generator sub-network 102 can generate the background image(s) 112 based on the distributions and probabilities of pixel characteristics that were determined at 204. For example, in the images 108 of one or more anomalies, certain neighboring pixels can have greater probabilities of similar appearances and that differ from the characteristics of the pixels representing the anomalies. These pixels can represent segments of the images that are not anomalies.

For example, portions of a thermal barrier coating on a turbine blade that are not damaged can appear as lighter sections of the images (e.g., relative to damaged portions of the coating). The distributions of the characteristics of the pixels depicting the non-damaged portions of the coating can represent greater probabilities that these pixels are close to each other (e.g., within a designated distance), that these pixels have intensities and/or colors within a designated threshold of each other, and/or that these pixels have intensities and/or colors that are outside of the designated threshold of other pixels (e.g., those pixels representing spalling of the coating).

The generator sub-network 102 can generate the background image(s) 112 to create additional images that do not include the anomalies shown in the training images 108. The background images 112 can be created without making copies of the training images 108 or without merely subtracting out the foregrounds of the training images 108. In one embodiment, the background images 112 include or depict only those pixels that do not represent the anomalies.

Figure 3:
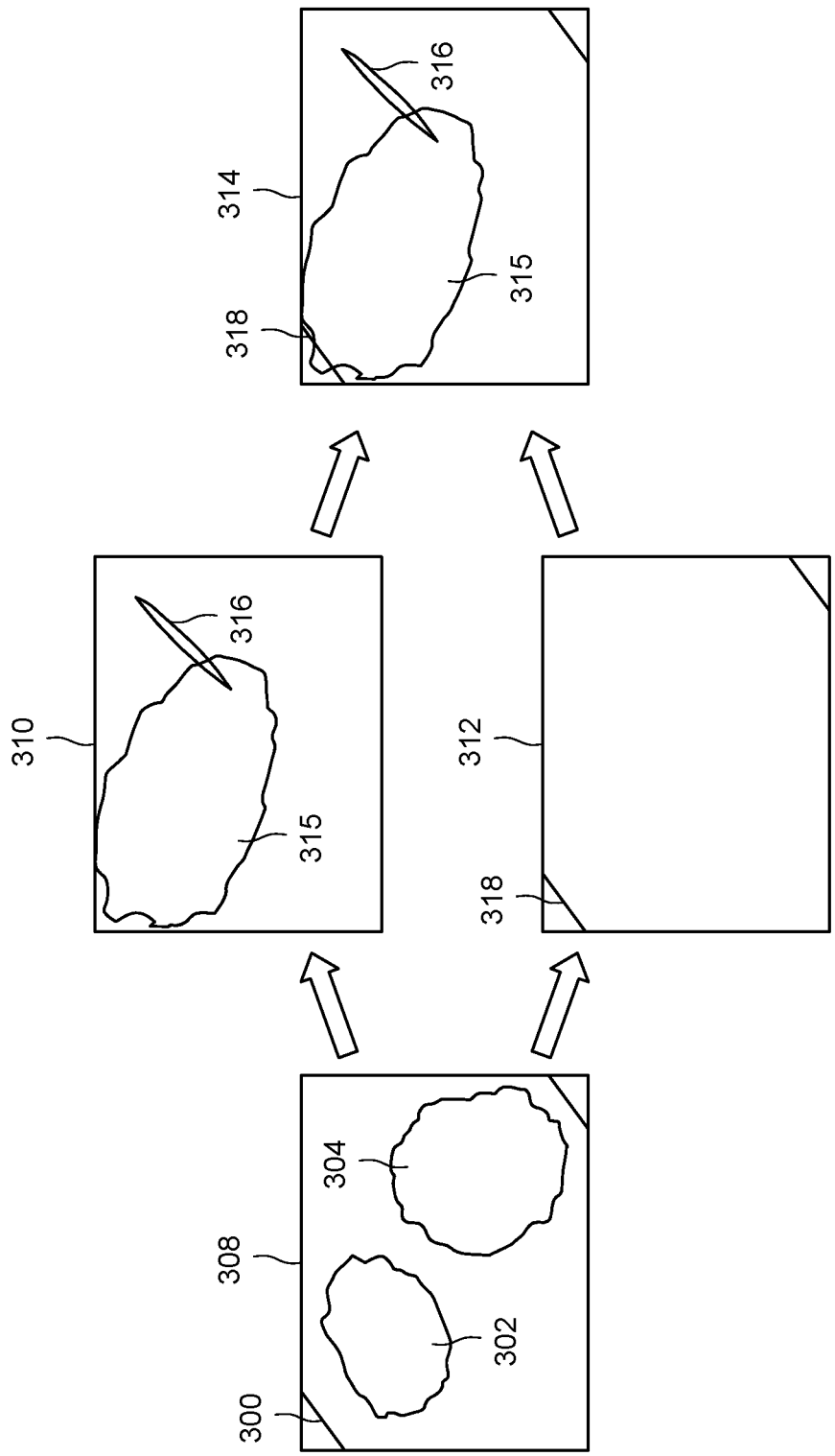
FIG. 3 illustrates one example of foreground and background images created by the generator sub-network shown in FIG. 1 based on one or more different unlabeled training images.

FIG. 3 illustrates one example of foreground and background images 310, 312 created by the generator sub-network 102 based on one or more different training images 308. In this example, the training image 308 depicts a thermal barrier coating 300 having spalling 302, 304. The spalling 302, 304 are anomalies in the training image(s) 308. The training images 308 can be different from each other, such as by representing different types (e.g., shapes) of spalling on the same or different thermal barrier coating. The generator sub-network 102 examines the training image(s) 308 to determine distributions of the characteristics of the pixels in the training image(s) 308, as described above.

Based on these distributions, the generator sub-network 102 creates the foreground image(s) 310 and the background image(s) 312, as described above in connection with the foreground image(s) 110 and the background image(s) 112 (which can represent the images 310, 312). As shown in FIG. 3, the foreground image(s) 310 created by the generator sub-network 102 depicts generator-created anomalies 315, 316 based on the pixel characteristics representing the spalling 302, 304 in the training image(s) 308. Because the anomalies 315, 316 are created by the generator sub-network 102 and are not mere copies of the anomalies 302, 304, the anomalies 315, 316 may have different shapes and/or sizes than the actual anomalies 302, 304. The background image(s) 312 created by the generator sub-network 102 depicts generator-created, undamaged coatings 318 based on the pixel characteristics representing the coatings 300 in the training image(s) 308.

Figure 4:
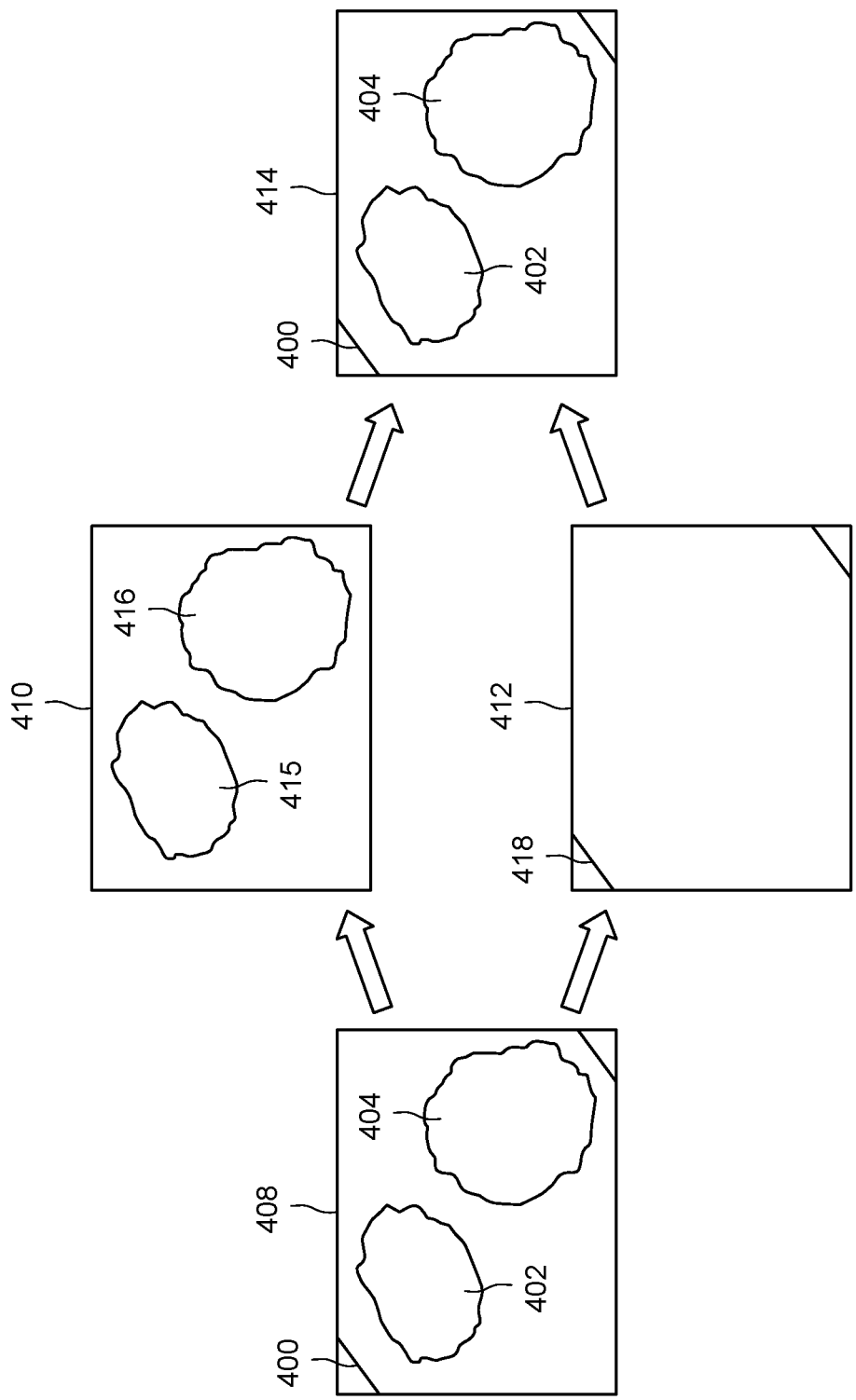
FIG. 4 illustrates another example of foreground and background images created by the generator sub-network shown in FIG. 1 based on one or more different unlabeled training images.

FIG. 4 illustrates another example of foreground and background images 410, 412 created by the generator sub-network 102 based on one or more different training images 408. In this example, the training image 308 depicts a thermal barrier coating 400 having spalling 402, 404. The spalling 402, 404 are anomalies in the training image(s) 408. The training images 408 can be different from each other, such as by representing different types (e.g., shapes) of spalling on the same or different thermal barrier coating. The generator sub-network 102 examines the training image(s) 408 to determine distributions of the characteristics of the pixels in the training image(s) 408, as described above. Based on these distributions, the generator sub-network 102 creates the foreground image(s) 410 and the background image(s) 412, as described above in connection with the foreground image(s) 110 and the background image(s) 112 (which can represent the images 410, 412).

As shown in FIG. 4, the foreground image(s) 410 created by the generator sub-network 102 depicts generator-created anomalies 415, 416 based on the pixel characteristics representing the spalling 402, 404 in the training image(s) 408. Because the anomalies 415, 416 are created by the generator sub-network 102 and are not mere copies of the anomalies 402, 404, the anomalies 415, 416 may have different shapes and/or sizes than the actual anomalies 402, 404. The background image(s) 412 created by the generator sub-network 102 depicts generator-created, undamaged coatings 400 based on the pixel characteristics representing the coatings 400 in the training image(s) 408.

Returning to the description of the flowchart of the method 200 shown in FIG. 2, at 210, the foreground and background images 110, 112 created by the generator sub-network 102 are combined into one or more consolidated images 114 (shown in FIG. 1). The foreground and background images 110, 112 can be combined by overlaying the foreground image 110 onto the background image 112, by overlaying the background image 112 onto the foreground image 110, by inserting the pixels of the foreground image 110 into the background image 112 in the corresponding locations of the pixels in the foreground image 110 (so that the pixels are in the same relative locations as in the foreground image 110), and/or by inserting the pixels of the background image 112 into the foreground image 110 in the corresponding locations of the pixels in the background image 112 (so that the pixels are in the same relative locations as in the background image 112). In one embodiment, the pixels of the foreground image 110 that represent the anomaly generated by the generator sub-network 102 replace the same pixels (e.g., in the same location) in the background image 112, without replacing other pixels.

As shown in FIGS. 3 and 4, the foreground images 310, 410 are combined with the background images 312, 412 to create consolidated images 314, 414. The consolidated image 314 combines the created anomalies 315, 316 in the foreground image 310 created by the generator sub-network 102 with the background in the background image 312 also created by the generator sub-network 102 based on the training images 308. The consolidated image 414 combines the created anomalies 415, 416 in the foreground image 410 created by the generator sub-network 102 with the background in the background image 412 also created by the generator sub-network 102 based on the training images 408. The generator sub-network 102 can create a single consolidated image from the foreground and background images, or can create multiple, different consolidated images from multiple, different foreground images and background images.

Returning to the description of the flowchart of the method 200 shown in FIG. 2, at 212, the consolidated image is examined by the discriminator sub-network 104. The discriminator sub-network 104 can examine characteristics of the pixels in the consolidated image 114, 314, 414 to determine whether the consolidated image 114, 314, 414 accurately reflects or depicts anomalies. For example, the discriminator sub-network 104 can examine the contents of the consolidated image 114, 314, 414 and determine one or more loss functions or errors for the consolidated image 114, 314, 414. The loss functions or errors can represent a confidence that the consolidated image 114, 314, 414 depicts actual anomalies (e.g., spalling) and not another feature. For example, large loss functions or errors can indicate that the consolidated image 114, 314, 414 shows something other than spalling, while smaller loss functions or errors can indicate that the consolidated image 114, 314, 414 shows spalling of a thermal barrier coating.

The discriminator sub-network 104 can determine the loss function or error by examining characteristics of the pixels in the consolidated image 114, 314, 414. For example, the discriminator sub-network 104 can determine that the characteristic of a first pixel in the consolidated image 114, 314, 414 is more similar to the distribution of pixel characteristics associated with the training image 108, 308, 408 than a different, second pixel in the consolidated image 114, 314, 414. The first pixel can be associated (by the discriminator sub-network 104) with a smaller error or loss function than the second pixel. The loss functions and/or errors can be determined for many or all pixels in the consolidated image 114, 314, 414. Consolidated images 114, 314, 414 having pixels with smaller loss functions or errors can be determined (e.g., by the discriminator sub-network 104) to depict actual anomalies than consolidated images 114, 314, 414 having larger loss functions or errors.

In one embodiment, the artificial neurons in the layers 106 of the discriminator sub-network 104 can examine individual pixels in the consolidated images 114, 314, 414. The processors (operating as the artificial neurons) can use linear classification to calculate scores for different categories of objects (referred to herein as "classes"), such as a tree, a car, a person, a bird, spalling of a thermal barrier coating, a crack in a surface, a sign, or the like. These scores can indicate the probability that a pixel represents different classes. Each artificial neuron can apply a mathematical function, such as an activation function, to the same pixel, with the functions applied by different neurons impacting the functions applied by other neurons and different neurons applying different weights to different terms in the functions than one or more, or all other neurons. Application of the functions generates the classification scores for the pixels, which can be used to identify the objects in the consolidated image 114, 314, 414. The neurons in the layers 106 of the discriminator sub-network 104 examine the characteristics of the pixels in the consolidated image 114, 314, 414, such as the intensities, colors, or the like, to determine the scores for the various pixels.

For example, the discriminator sub-network 104 can determine that a pixel in one of the consolidated image 114, 314, 414 has a score vector of [0.6 0.15 0.25]. This score vector indicates that the discriminator sub-network 104 has calculated a 60% probability that the pixel represents a first object class (e.g., spalling), a 15% probability that the pixel represents a second object class (e.g., a crack), and a 25% probability that the pixel represents a third object class (e.g., a thermal barrier coating). This process can be repeated for several, or all, other pixels in the same consolidated image 114, 314, 414.

The processors of the discriminator sub-network 104 can then determine the loss functions or errors for the pixels in the consolidated image 114, 314, 414 based on these probabilities. The loss function or error can be calculated as a difference between a selected object class for a 114 and the object score for that object class. This error value can be a difference between 100% (or one) and the probability of the selected object class. With respect to the preceding example, the first object class is the selected object class for the pixel because the first object class has a larger probability (i.e., 60%) than the other object classes for that same pixel. The loss function or error for that pixel can be calculated as [0.4 −0.15 −0.25]. The value of 0.4 (or 40%) is calculated as the difference between one and 0.6 (or between 100% and 60%). This process can be repeated for several, or all, of the pixels.

Returning to the description of the flowchart of the method 200 shown in FIG. 2, at 214, a determination is made as to whether the discriminator sub-network 104 is able to identify the consolidated image as showing an anomaly. For example, a determination is made as to whether the generator sub-network 102 was able to create the foreground image of an anomaly (e.g., spalling) that is identified by the discriminator sub-network 104 to be an actual image of an anomaly. The discriminator sub-network 104 can examine the loss functions of the consolidated image and compare the loss functions to one or more thresholds to determine if the consolidated image appears to show an anomaly. If the loss function or error is greater than the threshold, then the discriminator sub-network 104 may not identify the consolidated image as depicting an anomaly. But, if the loss function or error is not greater than the threshold, then the discriminator sub-network 104 may identify the consolidated image as showing an anomaly.

If the discriminator sub-network 104 determines that the consolidated image includes an anomaly, then flow of the method 200 can proceed toward 216. But, if the discriminator sub-network 104 determines that the consolidated image includes an anomaly, then flow of the method 200 can return toward 204. For example, the method 200 can return to the generator sub-network 102 attempting to create one or more additional foreground and/or background images, and combining the foreground and background images into one or more consolidated images, to cause the discriminator sub-network 104 to identify the created consolidated images as actual images of anomalies (e.g., cracks, spalling, etc.). The generator sub-network 102 can change how the foreground and/or background images are created. For example, the generator sub-network 102 can change one or more of the functions and/or weights used to create the foreground and/or background images. This can allow the generator sub-network 102 to improve on how the consolidated images are created to be more likely to be interpreted or identified by the discriminator sub-network 104 as images of actual anomalies. Optionally, the method 200 can terminate.

At 216, the generator sub-network 102 creates one or more images for training another neural network. For example, the generator sub-network 102 can create one or more consolidated images that are communicated to an artificial neural network for training that neural network to automatically identify anomalies in actual images of equipment. The consolidated images are generated as labeled images in that the images are artificial images created by the generator sub-network 102 to represent what anomalies should and/or will look like. The consolidated images can be automatically labeled by the generator sub-network 102 because the generator sub-network 102 determines what each pixel in the consolidated images represent. The neural network that receives the consolidated images can be trained to automatically identify actual anomalies in equipment using the consolidated images in addition to or in place of the neural network being trained with other, manually labeled images.

Figure 5:
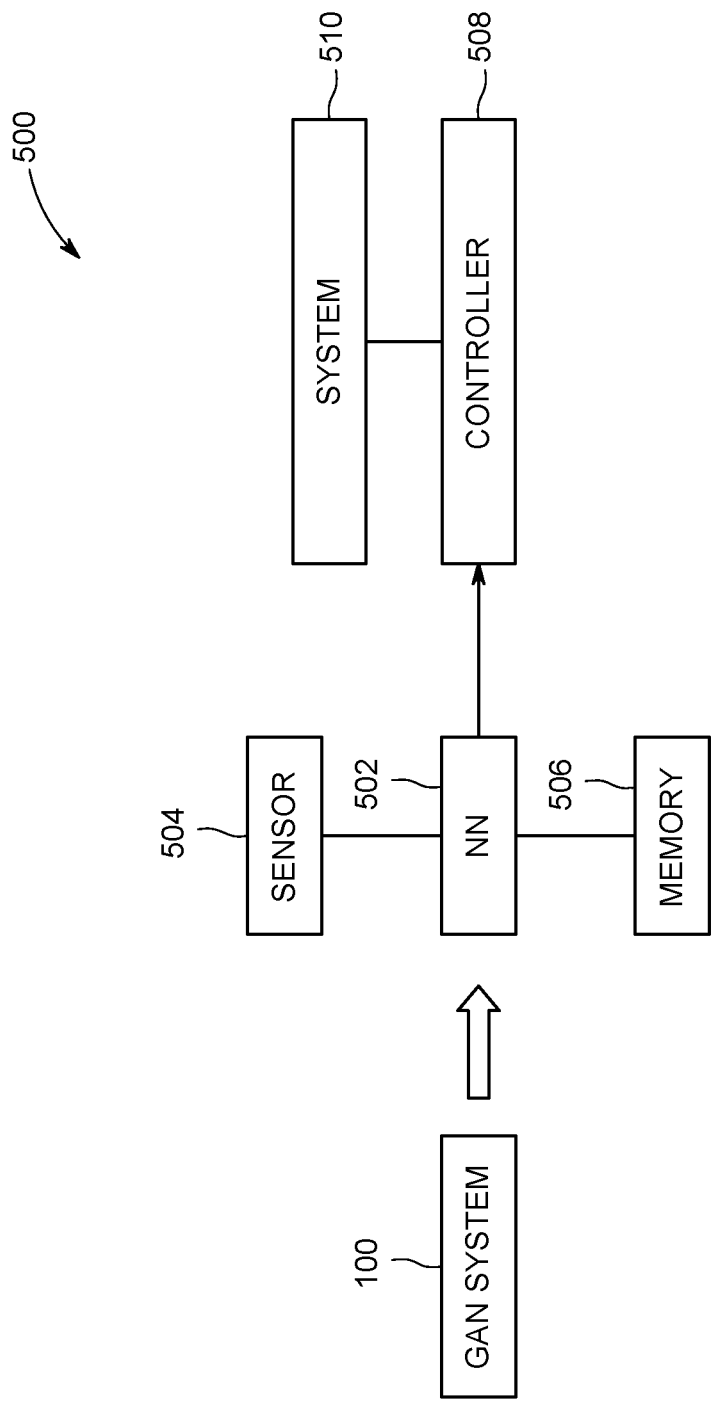
FIG. 5 illustrates one example of a visual anomaly detection system.

FIG. 5 illustrates one example of a visual anomaly detection system 500. The system 500 includes the GAN system 100 described above, which creates consolidated images (also as described above) for training another artificial neural network 502. The neural network 502 is divided into two or more layers, such as input layers that receive images, output layers that output an image or loss function (e.g., error, as described below), and one or more intermediate layers. The layers represent different groups or sets of artificial neurons, which can represent different functions performed by the processors on the images to identify anomalies in the images. The neural network 502 can operate in a manner similar to the discriminator sub-network 104 to identify objects (e.g., anomalies) in images in one embodiment.

The system 500 includes a sensor 504 that obtains images of objects, such a camera that provides images or video frames of equipment to the GAN system 100 as the images 108. Optionally, the control system 500 includes a memory 506, such as a computer hard drive, optical disc, or the like, that stores the images 108 for the GAN system 100.

The GAN system 100 can produce labeled training images for use in training the neural network 502 to automatically identify objects in additional images acquired and provided to the neural network 502. In addition or in place of manually-labeled training images being obtained and provided to the neural network 502 to train the neural network 502 to automatically identify objects (e.g., anomalies) in other images, the GAN system 100 can generate training images from unlabeled or lightly labeled images, as described above. The training images that are output from the GAN system 100 can be one or more of the consolidated images 114, 314, 414, or optionally can be one or more additional images generated by the generator sub-network 102 after the generator sub-network 102 is trained to create consolidated images 114, 314, 414 that are identified by the discriminator sub-network 104 as depicting the same or similar objects (e.g., anomalies) as are in the images 108 previously provided to the generator sub-network 102.

The trained neural network 502 can automatically identify objects in other images provided to the neural network 502. After being trained by images created by the generator sub-network 102, the neural network 502 can receive additional images from the sensor 504, the memory 506, or another source, and can examine these images to identify anomalies. For example, the trained neural network 502 can automatically identify spalling or cracks in thermal barrier coatings on turbine blades, automatically identify persons or other objects near a moving vehicle, or the like.

The identified objects can be communicated to a controller 508 of an automated powered system 510. The controller 508 represents hardware circuitry that includes and/or is connected with one or more processors (e.g., one or more microprocessors, field programmable gate arrays, integrated circuits, etc.). The controller 508 controls operation of the powered system 510, which can represent an automated robotic system that operates to repair the component, such as by spraying an additive onto a coating of the component, by replacing the component, or the like, responsive to an anomaly being identified by the neural network 502. Optionally, the controller 508 can change a direction of travel and/or slow or stop movement of a vehicle (that is or that includes the powered system 510).

In one embodiment, a GAN system includes a generator neural sub-network configured to receive one or more images depicting one or more objects. The generator neural sub-network also is configured to generate a foreground image and a background image based on the one or more images that are received, the generator neural sub-network configured to combine the foreground image with the background image to form a consolidated image. The GAN system also includes a discriminator neural sub-network configured to examine the consolidated image and determine whether the consolidated image depicts at least one of the objects. The generator neural sub-network is configured to one or more of provide the consolidated image or generate an additional image as a training image used to train another neural network to automatically identify the one or more objects in one or more other images.

Optionally, the one or more objects include damage to equipment. The generator neural sub-network can be configured to generate the foreground image as a generated image of at least one of the objects without a background from the one or more images received by the generator neural sub-network. The generator neural sub-network can be configured to generate the background image as a generated image of a background from the one or more images received by the generator neural sub-network without the one or more objects being included in the background image.

Optionally, the generator neural sub-network is configured to generate one or more of the foreground image or the background image based on one or more distributions of pixel characteristics from the one or more images received by the generator neural sub-network. The generator neural sub-network can be configured to receive the one or more images without pixels of the one or more images that are received being labeled as depicting one or more object classes. The generator neural sub-network can be configured to generate the additional image as the training image with pixels of the training image associated with one or more object classes.

In one embodiment, a method includes receiving one or more images depicting one or more objects at a generator neural sub-network of a generative adversarial network (GAN) system, generating a foreground image and a background image using the generator neural sub-network and based on the one or more images that are received, combining the foreground image with the background image to form a consolidated image using the generator neural sub-network, and examining the consolidated image and determine whether the consolidated image depicts at least one of the objects using a discriminator neural sub-network of the GAN system. One or more of the consolidated image or an additional generated image is configured to be provided to another artificial neural network as a training image for training the artificial neural network to automatically identify the one or more objects in one or more other images.

Optionally, the one or more objects include damage to equipment. The foreground image can be generated by the generator neural sub-network as a generated image of at least one of the objects without a background from the one or more images received by the generator neural sub-network. The background image can be generated by the generator neural sub-network as a generated image of a background from the one or more images received by the generator neural sub-network without the one or more objects being included in the background image. One or more of the foreground image or the background image can be configured to be generated by the generator neural sub-network based on one or more distributions of pixel characteristics from the one or more images received by the generator neural sub-network.

Optionally, the one or more images are received by the generator neural sub-network without pixels of the one or more images being labeled as depicting one or more object classes. The additional image can be generated by the generator neural sub-network as the training image with pixels of the training image associated with one or more object classes.

In one embodiment, a GAN system includes a generator neural sub-network configured to receive one or more images depicting one or more objects. The generator neural sub-network also is configured to generate a foreground image and a background image based on the one or more images that are received, the generator neural sub-network configured to combine the foreground image with the background image to form a consolidated image. The GAN system also includes a discriminator neural sub-network configured to examine the consolidated image and determine whether the consolidated image depicts at least one of the objects. The generator neural sub-network is configured to one or more provide the consolidated image or generate an additional image as a training image used to train another neural network to automatically identify the one or more objects in one or more other images. The generator neural sub-network is configured to receive the one or more images without pixels of the one or more images that are received being labeled as depicting one or more object classes.

Optionally, the one or more objects include damage to equipment. The generator neural sub-network can be configured to generate the foreground image as a generated image of at least one of the objects without a background from the one or more images received by the generator neural sub-network. The generator neural sub-network can be configured to generate the background image as a generated image of a background from the one or more images received by the generator neural sub-network without the one or more objects being included in the background image.

Optionally, the generator neural sub-network is configured to generate one or more of the foreground image or the background image based on one or more distributions of pixel characteristics from the one or more images received by the generator neural sub-network. The generator neural sub-network can be configured to generate the additional image as the training image with pixels of the training image associated with one or more object classes.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A generative adversarial network (GAN) system comprising:
a generator neural sub-network configured to receive one or more images depicting one or more objects, the generator neural sub-network also configured to generate a foreground image and a background image based on the one or more images that are received, the generator neural sub-network configured to combine the foreground image with the background image to form a consolidated image;
a discriminator neural sub-network configured to examine the consolidated image and determine whether the consolidated image depicts at least one of the objects; and
a neural network configured to receive the consolidated image from the generator neural sub-network as a training image, the neural network configured to be trained to automatically identify the one or more objects in one or more other images,
wherein the neural network identifies at least one damaged coating on the one or more objects after being trained using the consolidated image,
wherein the one or more objects further comprise at least one component of a gas turbine engine onto which the at least one damaged coating is disposed.

2. The GAN system of claim 1, wherein the generator neural sub-network is configured to generate the foreground image as a generated image of at least one of the objects without a background from the one or more images received by the generator neural sub-network, and
wherein the generator neural sub-network identifies at least one darker quasi-circular shape on a lighter background as spalling of a thermal barrier coating.

3. The GAN system of claim 1, wherein the generator neural sub-network is configured to generate the background image as a generated image of a background from the one or more images received by the generator neural sub-network without the one or more objects being included in the background image, and
wherein the generator neural sub-network forms the consolidated image by overlaying the foreground image onto the background image.

4. The GAN system of claim 1, wherein the generator neural sub-network is configured to generate one or more of the foreground image or the background image based on one or more distributions of pixel characteristics from the one or more images received by the generator neural sub-network, and
wherein the generator neural sub-network forms the consolidated image by overlaying the background image onto the foreground image.

5. The GAN system of claim 1, wherein the generator neural sub-network is configured to receive the one or more images without pixels of the one or more images that are received being labeled as depicting one or more object classes, and
wherein the generator neural sub-network forms the consolidated image by inserting one or more pixels of the foreground image into the background image in corresponding locations of the one or more pixels in the foreground image.

6. The GAN system of claim 1, wherein the generator neural sub-network is configured to generate the consolidated image as the training image with pixels of the training image associated with one or more object classes, and
wherein the generator neural sub-network calculates at least one score for at least one category of the one or more objects using at least one linear classification.

7. A method comprising:
receiving one or more images depicting one or more objects at a generator neural sub-network of a generative adversarial network (GAN) system;
generating a foreground image and a background image using the generator neural sub-network and based on the one or more images that are received;
combining the foreground image with the background image to form a consolidated image using the generator neural sub-network;
examining the consolidated image and determine whether the consolidated image depicts at least one of the objects using a discriminator neural sub-network of the GAN system,
wherein one or more of the consolidated image or an additional generated image is configured to be provided to another artificial neural network as a training image for training the artificial neural network to automatically identify the one or more objects in one or more other images, and
wherein the artificial neural network automatically identifies the one or more objects by determining that the foreground image is at least one of darker than, lighter than, and a different color than the background image, the one or more objects include spalling of a thermal barrier coating; and
identifying, at the generator neural sub-network, at least one darker quasi-circular shape on a lighter background as the spalling of a thermal barrier coating.

8. A generative adversarial network (GAN) system comprising:
a generator neural sub-network configured to receive one or more images depicting one or more objects, the generator neural sub-network also configured to generate a foreground image and a background image based on the one or more images that are received, the generator neural sub-network configured to combine the foreground image with the background image to form a consolidated image;
a discriminator neural sub-network configured to examine the consolidated image and determine whether the consolidated image depicts at least one of the objects; and
a neural network configured to receive the consolidated image as a training image, the neural network configured to be trained to automatically identify the one or more objects in one or more other images using the training image,
wherein the generator neural sub-network is configured to receive the one or more images without pixels of the one or more images that are received being labeled as depicting one or more object classes, and
wherein the one or more objects further comprise at least one component of a gas turbine engine onto which the at least one damaged coating is disposed.

9. The GAN system of claim 8, wherein the one or more objects include damage to the at least one component,
   wherein the at least one component comprises a turbine blade.

10. The GAN system of claim 8, wherein the generator neural sub-network is configured to generate the foreground image as a generated image of at least one of the objects without a background from the one or more images received by the generator neural sub-network, and
   wherein the generator neural sub-network forms the consolidated image by inserting one or more pixels of the background image into the foreground image in corresponding locations of the one or more pixels in the background image.

11. The GAN system of claim 8, further comprising at least one field programmable gate array, wherein the generator neural sub-network is configured to generate the background image as a generated image of a background from the one or more images received by the generator neural sub-network without the one or more objects being included in the background image.

12. The GAN system of claim 8, wherein the generator neural sub-network is configured to generate one or more of the foreground image or the background image based on one or more distributions of pixel characteristics from the one or more images received by the generator neural sub-network, and
   wherein less than 50% of the pixels in the training images are labeled.

13. The GAN system of claim 8, wherein the generator neural sub-network is configured to generate the consolidated image as the training image with pixels of the training image associated with one or more object classes, and
   wherein less than 10% of the pixels in the training images are labeled.

* * * * *